UNITED STATES PATENT OFFICE.

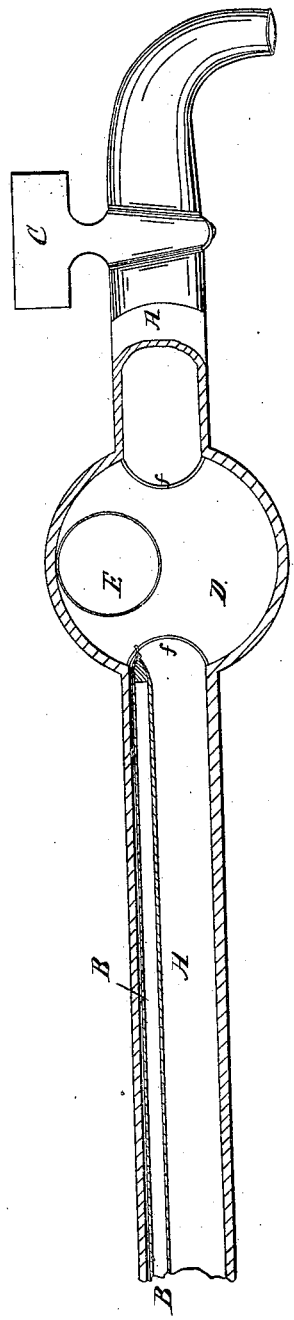

JOHN BEVAN, OF NEW YORK, N. Y.

IMPROVEMENT IN APPARATUS FOR PREVENTING WATER-PIPES FROM BURSTING.

Specification forming part of Letters Patent No. 46,773, dated March 14, 1865.

*To all whom it may concern:*

Be it known that I, JOHN BEVAN, of 39 Nassau street, in the city, county, and State of New York, have invented certain new and Improved Means of Preventing Water-Pipes from Bursting; and I do hereby declare that the following is a full, clear, and exact description of the same, reference being had to the accompanying drawing, which represents a central longitudinal section of a piece of water service pipe and attached faucet having my invention applied.

The object of my invention is to prevent the bursting of water-pipes by an increase of pressure produced, either by expansion of the water in freezing or by the sudden cutting off of the flow of water, which produces what may be termed the "hydraulic throb;" and to this end it consists, first, in placing an elastic or flexible, compressible, and water-tight hollow ball within a suitable chamber provided in the pipe near and in communication with the faucet whence the water is drawn off; and, secondly, in placing directly within the service pipe an elastic or flexible compressible and water-proof closed tube.

A is the water-service pipe. C is the faucet attached to the said pipe for drawing off the water. D is the chamber provided in the pipe A, near the faucet C, for containing the elastic or flexible compressible hollow ball E, the said chamber being equivalent to an enlargement of the said pipe. $f\,f$ are wire guards, placed at the connections of the chamber D with the smaller portions of the pipe, to prevent the ball E from closing the passage. B is the elastic or flexible compressible waterproof tube placed directly within the service-pipe and closed at both ends. This tube should extend through the whole length of that portion of the pipe A which is exposed to the action of frost, and may be secured to the said pipe at its ends or at certain intervals to keep it in place. The tube B and ball E may be made of india-rubber or gutta-percha, and should be strong enough to resist the pressure due to the head of water without compression, and should contain nothing but air.

In case of any increase of pressure of the water in the pipe, produced by the sudden closing of the faucet, both the ball E and tube B will be compressed, and the pipe A will thus be relieved from the effect of such increase of pressure and prevented from bursting. Where increase of pressure from this cause alone is to be guarded against, either the ball E or tube B alone might be made large enough to constitute a sufficient safeguard, except for pipes subjected to the pressure of a very high head of water, in which case, though the ball might be made of sufficient capacity to serve the purpose, the tube alone might require the pipe A to be of unreasonable size to give the required area of water-passage; but when the effect of the expansion of water by freezing is to be guarded against the tube B must be used, as the protection requires to extend the whole length of the exposed portion of the pipe A. Where both the effect of the sudden cutting off and of freezing are to be guarded against, it will be better to use the tube and ball. The ball E may be of spherical or other form.

What I claim as my invention, and desire to secure by Letters Patent, is—

1. The elastic or flexible compressible water-tight ball E, placed within a suitable chamber, D, provided in a water-pipe, substantially as and for the purpose herein specified.

2. The closed elastic or flexible compressible water proof tube B, placed directly within and extending any suitable distance along the passage of a water-pipe, A, substantially as and for the purpose herein set forth.

JOHN BEVAN.

Witnesses:
J. W. COOMBS,
GEO. W. REED.